(12) United States Patent
Sheng et al.

(10) Patent No.: US 9,590,510 B1
(45) Date of Patent: Mar. 7, 2017

(54) CABLE IR DROP COMPENSATION

(71) Applicant: GOOGLE INC., Mountian View, CA (US)

(72) Inventors: Honggang Sheng, Milpitas, CA (US); Choon Ping Chng, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 173 days.

(21) Appl. No.: 14/495,380

(22) Filed: Sep. 24, 2014

(51) Int. Cl.
*H02M 3/335* (2006.01)

(52) U.S. Cl.
CPC ................. *H02M 3/33507* (2013.01)

(58) Field of Classification Search
CPC .. G05F 1/575; G05F 1/59; G05F 5/00; G09G 2300/0819; H02M 1/00; H02M 2001/0019; H02M 2001/0022; H02M 3/156; H02M 3/1563; H02M 3/33523
See application file for complete search history.

(56) References Cited

U.S. PATENT DOCUMENTS

| | | | |
|---|---|---|---|
| 4,652,987 A | 3/1987 | Matthews et al. | |
| 8,232,785 B2 | 7/2012 | Sun | |
| 2006/0170402 A1* | 8/2006 | Banerjee | G05F 1/56 323/273 |
| 2008/0129261 A1* | 6/2008 | Oelmaier | G05F 1/56 323/273 |
| 2008/0246447 A1* | 10/2008 | Djenguerian | H02M 3/33523 323/234 |
| 2008/0259654 A1* | 10/2008 | Huynh | H02M 3/33523 363/21.16 |
| 2009/0015228 A1* | 1/2009 | Sato | H02M 3/33523 323/283 |
| 2009/0016086 A1* | 1/2009 | Huynh | H02M 3/33523 363/80 |
| 2010/0181840 A1 | 7/2010 | Coulson et al. | |
| 2012/0086694 A1 | 4/2012 | Tseng et al. | |
| 2012/0250366 A1* | 10/2012 | Wang | H02M 3/33523 363/21.15 |
| 2013/0100715 A1* | 4/2013 | Lin | H02M 3/33507 363/21.17 |
| 2013/0300384 A1* | 11/2013 | Wang | H02M 1/36 323/271 |
| 2013/0301310 A1* | 11/2013 | Wang | H02M 3/33523 363/21.12 |
| 2013/0301311 A1* | 11/2013 | Wang | H02M 3/33515 363/21.13 |

* cited by examiner

*Primary Examiner* — Adolf Berhane
*Assistant Examiner* — Henry Lee, III
(74) *Attorney, Agent, or Firm* — Brake Hughes Bellermann LLP

(57) ABSTRACT

According to an aspect, an adaptor may include a converting unit configured to convert a source voltage to an output voltage to be provided to a computing device via a cable. The converting unit includes a transformer having primary windings and secondary windings. The adaptor includes a current sense unit configured to obtain a current sense signal, where the current sense signal indicates an output current produced by the secondary windings of the transformer. The adaptor includes an IR drop detection unit configured to determine a feedback signal representing a voltage drop caused by the cable based on the current sense signal and the output voltage of the converting unit, and a control unit configured to adjust the output voltage of the converting unit to account for the voltage drop represented by the feedback signal.

20 Claims, 4 Drawing Sheets

CABLE IR DROP COMPENSATION

BACKGROUND

An adaptor for a computing device provides the ability to transfer power from a power source to the computing device so that the computing device can operate and/or charge a battery of the computing device. In some examples, the adaptor may output a fixed voltage that corresponds to the voltage requirement of the computing device. In other examples, the output voltage may be negotiated such that the adaptor can provide a range of voltage levels. For example, the adaptor may be a Universal Serial Bus (USB) with power negotiation capabilities such as a USB-PD compliant adaptor.

However, the output voltage provided by the adaptor may be affected by the impedance or resistance associated with the adaptor's cable. The drop in voltage caused by the cable's resistance may be referred to as IR drop. In some conventional approaches, the output voltage may be compensated to account for the voltage drop in order to provide the level of voltage required by the computing device. For example, cable IR drop compensation may be performed on the transformer's primary-side or the transformer's secondary-side. For adaptors having power negotiation capabilities, conventional primary-side cable IR drop compensation may be difficult to achieve. Secondary-side cable IR drop compensation is based on the transformer's secondary output voltage which will increase as current increases. However, conventional designs for secondary-side cable IR drop compensation may be less effective when output voltage is varied and may be subjected to a long delay time for cable IR drop compensation to be effective. Furthermore, conventional designs for secondary-side cable IR drop compensation may be complicated and expensive.

SUMMARY

The details of one or more implementations are set forth in the accompanying drawings and the description below. Other features will be apparent from the description and drawings, and from the claims.

According to an aspect, an adaptor may include a converting unit configured to convert a source voltage to an output voltage to be provided to a computing device via a cable. The converting unit includes a transformer having primary windings and secondary windings. The adaptor includes a current sense unit configured to obtain a current sense signal, where the current sense signal indicates an output current produced by the secondary windings of the transformer. The adaptor includes an IR drop detection unit configured to determine a feedback signal representing a voltage drop caused by the cable based on the current sense signal and the output voltage of the converting unit, and a control unit configured to adjust the output voltage of the converting unit to account for the voltage drop represented by the feedback signal.

The adaptor may include one or more of the following features (or any combination thereof). The adaptor may include a power negotiator configured to determine the output voltage among a plurality of output voltages, where the output voltage corresponds to a voltage requirement of the computing device. The current sense unit may include a sense resistor connected to the secondary windings and an operational amplifier, where the operational amplifier is configured to sense the output current through the sense resistor. The IR drop detection unit may include a switch configured to switch between at least a first state and a second state based on the current sense signal, and the IR drop detection unit is configured to determine the feedback signal based on the switch being in either the first state or the second state. In some examples, the switch may be a semiconductor field-effect transistor. In some examples, the switch may be a bipolar junction transistor. The feedback signal may be a portion of the output voltage representing the voltage drop caused by the cable. The IR drop detection unit may include a voltage divider having a first impendence, a second impendence, a compensation impendence, and a switch. The control unit may receive a voltage reference signal, and may determine whether to adjust the output voltage based on a comparison of the voltage reference signal with the feedback signal.

According to an aspect, an adaptor for IR drop compensation includes a converting unit configured to convert a source voltage to an output voltage to be provided to a computing device via a cable. The converting unit includes a transformer having primary windings and secondary windings. The adaptor includes a current sense unit configured to obtain a current sense signal, where the current sense signal indicates an output current produced by the secondary windings of the transformer. The adaptor includes an IR drop detection unit configured to determine a feedback signal representing a voltage drop caused by the cable based on the current sense signal and the output voltage of the converting unit. The IR drop detection unit includes a switch controlled by the current sense signal and a voltage divider unit having a first impedance and a second impedance. The voltage divider unit is configured to obtain a portion of the output voltage according to the first impedance and the second impedance. The switch is configured to decrease an effective impedance of the second impedance based on a state of the switch. The adaptor includes a control unit configured to adjust the output voltage to account for the voltage drop based on the feedback signal.

The adaptor may include one or more of the following features (or any combination thereof). The adaptor may include a power negotiator configured to determine the output voltage among a plurality of output voltages, where the output voltage corresponds to a voltage requirement of the computing device. The current sense unit may include a sense resistor connected to the secondary windings and an operational amplifier, where the operational amplifier is configured to sense the output current through the sense resistor. The switch may be configured to switch between at least a first state and a second state based on the current sense signal, where the second state decreases the effective impedance of the second impedance as compared to the effective impedance of the first state. In some examples, the first state does not provide voltage drop compensation, and the second state provides maximum voltage drop compensation. The switch may be a semiconductor field-effect transistor. In some examples, the switch may be a bipolar junction transistor.

According to an aspect, a method for IR drop compensation may include converting, by a converting unit, a source voltage to an output voltage to be provided to a computing device via a cable, where the converting unit includes a transformer having primary windings and secondary windings. The method includes obtaining a current sense signal indicating an output current produced by the secondary windings of the transformer, determining a feedback signal representing a voltage drop caused by the cable based on the current sense signal and the output voltage of the converting unit, and adjusting the output voltage to account for the voltage drop based on the feedback signal.

The method may include one or more of the following features (or any combination thereof). The method may include determining the output voltage among a plurality of output voltages, where the output voltage corresponds to a voltage requirement of the computing device. The feedback signal may be a portion of the output voltage representing the voltage drop caused by the cable, and the portion of the output voltage is correlated with the output current. The adjusting the output voltage may include receiving a voltage reference signal and determining whether to adjust the output voltage based on a comparison of the voltage reference signal and the feedback signal.

DETAILED DESCRIPTION

The devices and methods discussed herein provide an IR drop compensation circuit for an adapter that uses output current on the secondary-side of the transformer to adjust the output voltage to compensate for voltage drop (also referred to as IR drop) caused by the cable's resistance. In some examples, the IR drop compensation circuit may provide cost savings by reducing the number of components typically used for IR drop compensation on the secondary-side within adapters using voltage negotiation. These and other features are further discussed with respect to the figures.

Figure 1:
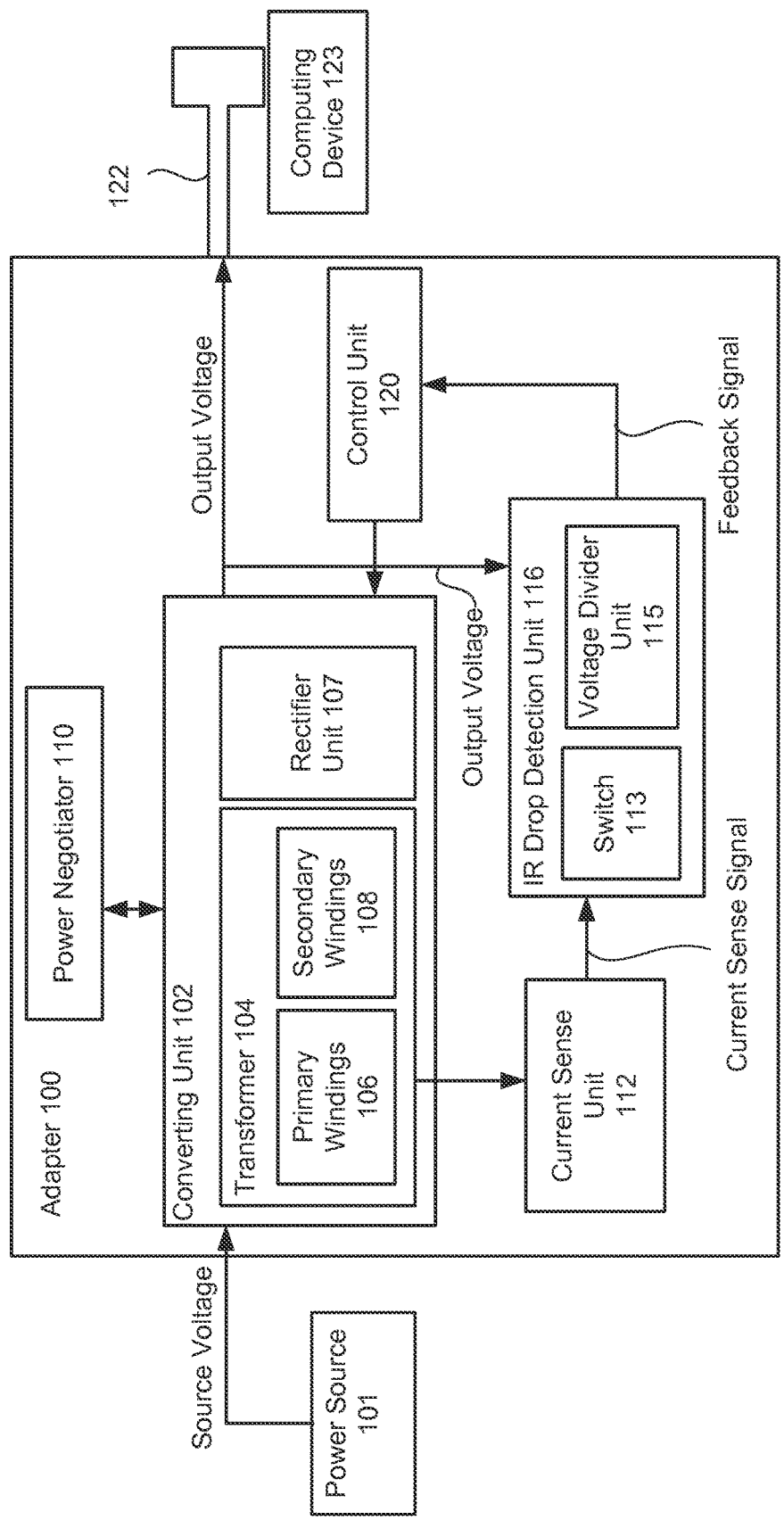
FIG. 1 illustrates an adaptor for IR drop compensation according to an aspect.

FIG. 1 illustrates an adaptor 100 for compensating voltage drop caused by its cable's resistance according to an aspect. As further explained below, the adaptor 100 may use output current on the secondary-side for compensating IR drop caused by a cable 122 associated with the adaptor 100. The adaptor 100 may be any type of adaptor that transforms a source voltage from a power source 101 to an output voltage for powering or charging a computing device 123. The adaptor 100 may perform AC-DC conversion and/or DC-DC conversion such that the computing device 123 receives the appropriate level of DC voltage required by the design specification of the computing device 123. The adaptor 100 may provide any level of output voltage plus or minus a certain tolerance (e.g., +/−5%). In some examples, the adaptor 100 may provide an output voltage anywhere within the range of 5V to 20V. The cable 122 is used to deliver the output voltage to the computing device 123. However, the transportation of output voltage across the cable 122 may result in a current-dependent voltage drop (also referred to as IR drop or voltage drop) across the length of the cable 122 because of the finite conductivity of the cable 122.

In a non-limiting example, if the output current is 3 A and the output impedance of the cable 122 is 0.1 Ohm, the adaptor 100 may determine that the cable IR drop is 0.3V. For a 5V output adaptor, 0.3V is 6%. For a 20V output adaptor, 0.3V is 1.5%. Without IR drop compensation, the output voltage may be out of specification for the computing device 123 (especially for low output voltages). However, the adaptor 100 may determine the voltage level drop caused by the cable 122 using the output current, and then adjust the output voltage such that the output voltage substantially corresponds to the voltage required by the computing device 123. For example, for a 5V output voltage with a cable IR drop of 0.3V, the adaptor 100 may adjust the output voltage to account for the cable IR drop such that the output voltage is increased to be substantially around 5V plus or minus a certain acceptable tolerance.

The computing device 123 may be any type of computing device requiring electrical power such as a laptop, personal computer, phone, smartphone, tablet, gaming console, etc. The power source 101 may be any type of power source capable of providing a source voltage. In some examples, the power source 101 may be an alternating current (AC) source (e.g., AC outlet). The adaptor 100 may be associated with another cable 122 that is coupled to the power source 101 and is coupled to the adaptor 100. In some examples, the power source 101 may be a computing device such as laptop, personal computer, phone, smartphone, tablet, gaming console, etc. In some examples, the adaptor 100 may be separate from the power source 101 and the computing device 123 (e.g., a stand-alone adaptor device). In other examples, the adaptor 100 may be integrated into a computing device configured as the power source 101 as an adaptor interface. In some examples, the adaptor 100 may be a Universal Serial Bus (USB) adaptor capable of power negotiation such as a USB-PD adaptor.

The cable 122 may be any type of cable designed to the output voltage from the adaptor 100 to the computing device 123. The cable 122 may include one, two, or more than two conductive wires within an insulator housing. Also, the cable 122 may include a connector at one end portion of the cable 122 in order to removably couple to the adaptor 100, and a connector at the other end portion of the cable 122 in order to removably couple to the computing device 123. In other examples, the end portion of the cable 122 is fixedly coupled to the adaptor 100. In some examples, the cable 122 may be a USB-compliant cable. In some examples, the cable 122 may be a USB-PD-compliant cable. For example, the USB-PD-compliant cable may provide one or more DC voltage lines and one or more communication lines to detect the cable type and current rating of the cable 122 and/or determine the voltage level required by the computing device 123. As such, the cable 122 implemented as the USB-PD cable may provide a variety of output voltages, which can provide one of a number of output voltages.

The adaptor 100 may include a converting unit 102, a power negotiator 110, a current sense unit 112, an IR drop detection unit 116, and a control unit 120. Also, the adaptor 100 may include other components typically associated with an adaptor, which may vary depending on the type of implementation.

The power negotiator 110 may be configured to determine an output voltage (and/or current) required by the computing device 123. In some examples, the adaptor 100 may provide a range of output voltages, and the power negotiator 110 is used to determine which output voltage to supply the computing device 123. The power negotiator 110 may be used in conjunction with any type of cable 122. In some examples, the power negotiator 110 operates in conjunction with a USB-PD-compliant cable 122. The power negotiator 110 may negotiate a voltage for the computing device 123 such that the negotiated voltage is provided as the output voltage. In some examples, the power negotiator 110 may communicate with the computing device 123 via the cable 122 to determine the level of output voltage to supply the computing device 123, which may vary depending on the type of computing device 123 and/or power delivery requirements of the computing device 123. In some examples, the adaptor 100 does not provide a single fixed output voltage, but rather may select one of a number of available output voltages, which may change during operation/charging of the computing device 123 or may change when used with a different type of computing device 123. As such, the adaptor 100 may be used for multiple different types of computing devices 123 having different voltage requirements. For example, the adaptor 100 may be used to power a computing device 123 having a first output voltage requirement, and may be used to power a computing device 123 having a second output voltage requirement, where the first output voltage requirement is different (e.g., higher or lower) than the second output voltage requirement.

The converting unit 102 may be configured to convert the source voltage to the output voltage to be delivered to the computing device 123 via the cable 122. The converting unit 102 may include a transformer 104 having primary windings 106 and secondary windings 108, and a rectifier unit 107. Also, the term primary-side may refer to circuitry coupled to the primary windings 106, and the term secondary-side may refer to circuitry coupled to the secondary windings 108. The rectifier unit 107 may include any type and number of electrical devices used to convert to the output of the secondary windings 108 to the appropriate level of DC output voltage. In some examples, the rectifier unit 107 may include one or more diodes. In some examples, the rectifier unit 107 may include an arrangement of transistors.

The current sense unit 112 may be configured to obtain a current sense signal indicating an output current produced on the secondary windings 108 of the transformer 104. The output current may include an amount (or level) of current produced by the secondary windings 108. In some examples, the current sense signal may be a voltage that corresponds to the output current on the secondary windings 108. In a non-limiting example, the current sense signal of 0-3V may represent the output current of 0-3 A. For instance, if the current sense signal is 1V, the output current on the secondary windings 108 may be 1 A. However, these values are used for explanatory purposes only, where the current sense signal may encompass any type of voltage value representing the amount of output current on the secondary windings 108. The current sense unit 112 may be coupled to the secondary windings 108. In some examples, the current sense unit 112 may be implemented as part of an overcurrent protection (OCP) unit that senses the output current on the secondary windings 108. In some examples, the current sense unit 112 may be coupled to a ground path (or return path) provided between the secondary windings 108 and the computing device 123. The current sense unit 112 may include an arrangement of electrical components (e.g., one or more resistors, one or more operational amplifiers, and/or one or more capacitors) that are capable of sensing the output current on the secondary windings 108. In some examples, the current sense unit 112 may include a sense resistor provided on the ground path, and an operational amplifier coupled to the ground path at each side of the sense resistor, which detects the current through the sense resistor.

The IR drop detection unit 116 may be configured to receive the current sense signal and the output voltage. The IR drop detection unit 116 may determine a feedback signal representing a level of voltage drop caused by the cable 122 based on the current sense signal and the output voltage. The feedback signal may represent a portion of the output voltage that corresponds to the amount of output current sensed by the current sense unit 112. The portion of output voltage may represent the level of voltage drop caused by the cable 122. The level of voltage drop provided by the feedback signal may be correlated with the level of output current provided by the current sense signal. For example, the voltage drop caused by the cable's resistance may be a function of the current sense signal. For instance, as the output current increases beyond a threshold level, the voltage drop of the output voltage may increase relatively proportionally. As such, the level of voltage drop provided by the feedback signal is correlated with amount of output current sensed on the secondary windings 108.

In some examples, the IR drop detection unit 116 may include a switch 113 that is configured to be controlled (e.g., ON, OFF, partially ON, partially OFF, etc.) by the current sense signal. For example, depending on the amount of output current provided by the current sense signal, the switch 113 may be in one of a number of states. In some examples, the switch 113 is in a fully-off state when the output current is below a first threshold value (e.g., a first gate threshold value), and the switch 113 is in a fully-on state when the output current is above a second threshold value (e.g., a second gate threshold value). In some examples, the second threshold value is higher than the first threshold value. Also, the switch 113 can be in one or more intermediate states between the fully-on state and the fully-off state. In some examples, the switch 113 is a transistor. In some examples, the switch 113 is a bipolar junction transistor. In some examples, the switch 113 is a semiconductor field-effect transistor. In some examples, the switch 113 is a MOSFET transistor.

The IR drop detection unit 116 may be configured to receive the output voltage produced by the converting unit 102, and determine the feedback signal based on the state of the switch 113—which adjusts the amount of voltage corresponding to the voltage drop. For example, if the switch 113 is in a first state (e.g., fully-off), the IR drop detection unit 116 may determine the feedback signal as a first voltage level representing the output current of the secondary windings 108. If the switch is in a second state (e.g., fully-on), the IR drop detection unit 116 may determine the feedback signal as a second voltage level representing the output current of the secondary windings 108. The second voltage level may be different than the first voltage level—which may indicate that the output current has increased or that the output voltage has decreased, and that at least some IR drop compensation is needed. In some examples, the first voltage level and the second voltage level may be a portion (or fraction) of the output voltage. For example, lower voltages levels are used to represent the voltage drop since it may be relatively easier to process the feedback signal within the control unit 120, as further described below.

In some examples, the switch 113 is configured to adjust a voltage divider unit 115 that receives the output voltage and divides the output voltage to obtain the feedback signal, e.g., the portion of output voltage representing the level of voltage drop caused by the cable 122. For example, the voltage divider unit 115 may include a first impedance (first part or upper-part) in series with a second impedance (second part or lower-part). However, the state of the switch 113 determines whether or not the effective impedance of the second impedance is decreased (e.g., by placing an additional impedance in parallel with the second impedance)—which affects the output of the voltage divider unit 115 and thus the level of voltage drop of the feedback signal. For example, when the switch 113 is in the fully-off state, the IR drop detection unit 116 determines the feedback signal from the output voltage using only the first impedance and the second impedance (e.g., no compensation). However, when the switch 113 is in the fully-on state, additional impedance is placed in parallel with the second impedance, which decreases the effective impedance of the second part of the voltage divider unit 115. As a result, the output of the voltage divider unit 115 is pulled down, thereby providing maximum IR drop compensation.

The control unit 120 may be configured to adjust the output voltage produced by the converting unit 102 to account for the voltage drop based on the feedback signal. For example, the control unit 120 may be configured to adjust a duty cycle of a main switch on the primary-side of the transformer 104. The primary-side voltage is determined by the power source, but the primary-side voltage may be chopped by the main switch on the primary-side controlled by a power stage controller. The on and off of the main switch may determine the secondary-side output voltage, which the duty cycle of the switch (e.g., on-time/period) is used to indicate the switch behavior. In some examples, the control unit 120 receives a reference voltage signal, and compares the feedback signal to the reference voltage signal. Depending on the comparison, the control unit 120 may increase (or decrease) the output voltage in order to compensate for the voltage drop caused by the cable's resistance.

Figure 2:
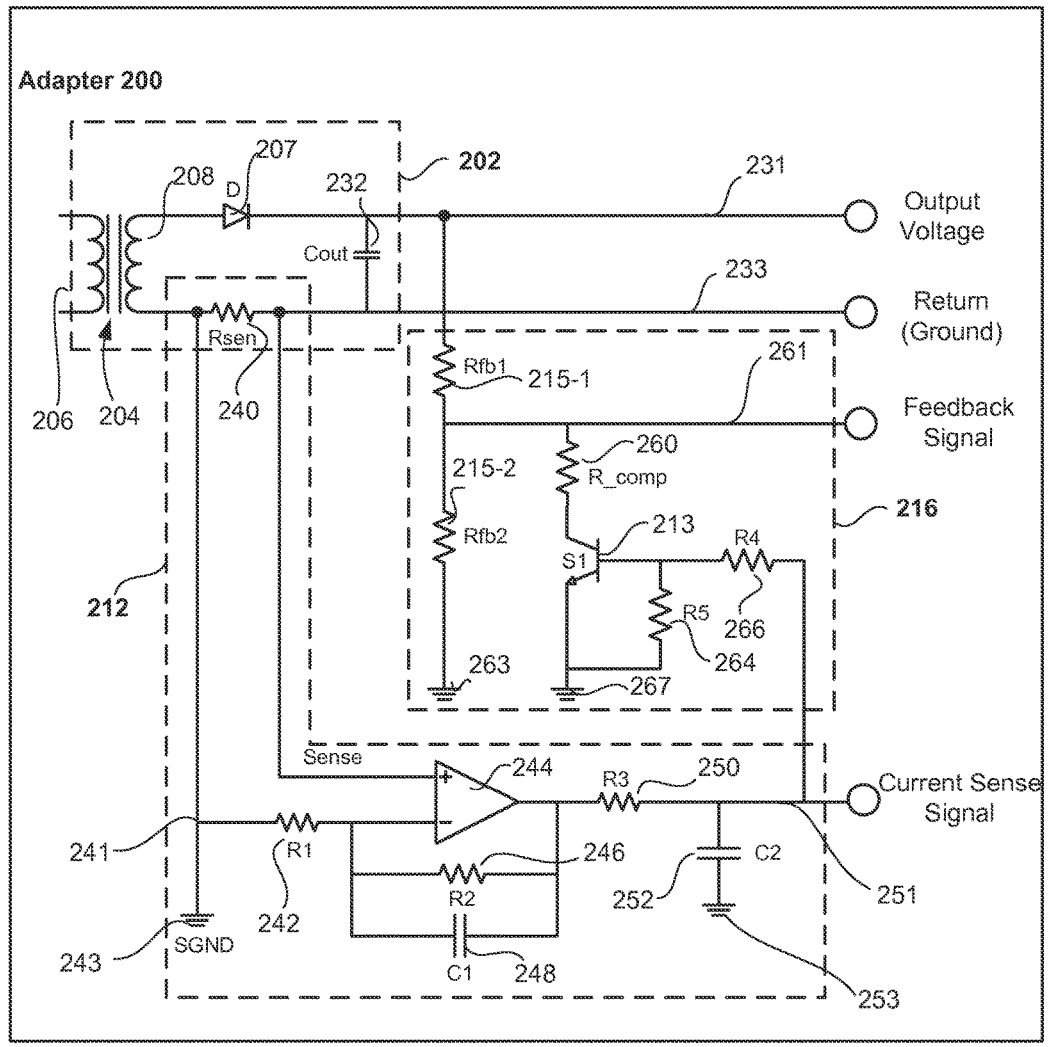
FIG. 2 illustrates an adaptor for IR drop compensation according to another aspect.

FIG. 2 illustrates an adaptor 200 for IR drop compensation according to an aspect. The adaptor 200 may include a converting unit 202 configured to convert a source voltage to an output voltage, a current sense unit 212 configured to obtain a current sense signal indicating an output current of the converting unit 202, and an IR drop detection unit 216 configured to determine a feedback signal indicating a level of voltage drop caused by the cable 122 based on the current sense signal. Also, the adaptor 200 may include other components and/or features explained with reference to FIG. 1 such as the control unit 120 and the power negotiator 110.

The converting unit 202 may transform a source AC voltage into a DC output voltage to be received by the computing device 123 via the cable 122. The converting unit 202 may include an arrangement of electrical devices that converts AC voltage (from the power source 101) to a certain level of DC voltage that corresponds to the specification of the computing device 123. Also, the converting unit 202 may operate in conjunction with the power negotiator 110 to adjust the level of output voltage to one of a number of output voltages as described above.

The converting unit 202 may include a transformer 204, and a rectifier unit 207. The transformer 204 may have primary windings 206 and secondary windings 208. Although the rectifier unit 207 is illustrated as a single diode in FIG. 2, the rectifier unit 207 may include any type and number of electrical devices used to convert to DC voltage (e.g., synchronized transistors). A varying current in the primary windings 206 creates a varying magnetic flux in the core and a varying magnetic field impinging on the secondary windings 208, and this varying magnetic field at the secondary windings 208 induces a varying electromotive force or voltage in the secondary windings 208. Also, the term primary-side may refer to the circuitry coupled to the primary windings 206, and the term secondary-side may refer to the circuitry coupled to the secondary windings 208. The adaptor 200 of FIG. 2 depicts the circuitry associated with the secondary-side of the transformer 204. However, the adaptor 200 may include electrical devices on the primary-side of the transformer 204 such as electrical devices implementing the control unit 120, and the power negotiator 110, as well as other components commonly known to one of ordinary skill in the art.

The adaptor 200 may include an output voltage line 231 coupled to a first end portion of the secondary windings 208, and a return (or ground) line 233 coupled to a second end portion of the secondary windings 208. An output capacitance 232 may exist between the output voltage line 231 and the return line 233. The output voltage line 231 and the return line 233 may be connected to the computing device 123 when the computing device 123 is connected to the adaptor 200 via the cable 122. The return line 233 may represent the ground path between the adaptor 200 and the computing device 123 such that the other end of the ground path is connected to a ground terminal of the computing device 123. The output voltage line 231 may represent the signal or power path between the adaptor 200 and the computing device 123 such that the other end of the power path is connected to the corresponding port or terminal on the computing device 123.

The current sense unit 212 may be configured to obtain the current sense signal indicating an output current on the secondary winding 208 of the transformer 204. For example, the current sense unit 212 may be coupled to the secondary windings 208 in order to sense a level of output current produced by the secondary windings 208. The current sense unit 212 may be coupled to the ground path represented by the return line 233 on the secondary-side of the transformer 204. In other examples, the current sense unit 212 is coupled to the output voltage line 231 or the power path. Also, the current sense unit 212 may be coupled to the IR drop detection unit 216 such that the IR drop detection unit 216 receives the current sense signal. Also, the current sense signal may be provided to other units (or applications) of the adaptor 200 such as an over-current protection (OCP) unit that protects the adaptor 200 from overcurrent. In some examples, the current sense unit 212 may be at least a portion of an OCP unit that senses the output current produced by the secondary windings 208. In some examples, the current sense unit 212 may include an arrangement of electrical components that are coupled to the secondary windings 208 that detects the output current produced by the secondary windings 208.

The current sense unit 212 may include a sense resistor 240, a first resistor 242, an operational amplifier 244, a second resistor 246, a first capacitor 248, a third resistor 250, and a second capacitor 252. In other examples, the current sense unit 212 may include the operational amplifier 244, and one or more of the sense resistor 240, the first resistor 242, the second resistor 246, the first capacitor 248, the third resistor 250, and the second capacitor 252. In other examples, the current sense unit 212 may include an arrangement of capacitors, resistors, and one or more operational amplifiers, that are capable of sensing the output current on the secondary windings 208. Also, in some examples, the first capacitor 248, the third resistor 250, and the second capacitor 252 may be omitted and/or replaced with one or more other electrical devices.

The current sense unit 212 may be configured to sense the level of output current over the sense resistor 240 using the operational amplifier 244. As shown in FIG. 2, the sense resistor 240 may be disposed on the return line 233. In some examples, the sense resistor 240 may be disposed on the return line 233 adjacent (or proximate) to the secondary windings 208 of the transformer 204. The current sense unit 212 may sense the current flowing through the return (or ground) path via the sense resistor 240. In other words, the current sense unit 212 may sense the amount of current through the sense resistor 240 disposed on the return line 233. In other examples, the sense resistor 240 is disposed on the output voltage line 231.

A first terminal (e.g., negative terminal) of the operational amplifier 244 may be coupled to the return line 233 on one side of the sense resistor 240, and a second terminal (e.g., positive terminal) of the operational amplifier 244 may be coupled to the return line 233 on the other side of the sense resistor 240. In some examples, the negative terminal of the operational amplifier 244 may be connected to a first terminal of the sense resistor 240, and the positive terminal of the operational amplifier 244 may be connected to a second terminal of the sense resistor 240. In some examples, the positive terminal of the operational amplifier 244 may be directly connected to the return line 233 or the second terminal of the sense resistor 240. For example, the negative terminal of the operational amplifier 244 may be coupled to a terminal of the first resistor 242, and the other terminal of the first resistor 242 may be connected to a point 241, where the point 241 is coupled to the return line 233 (or the first terminal of the sense resistor 240) and a ground 243.

Also, the operational amplifier 244 may include a first negative feedback path having the second resistor 246 and a second negative feedback path (in parallel with the first negative feedback path) having the first capacitor 248. A current sense line 251 of the operational amplifier 244 may produce the current sense signal. In some examples, the third resistor 250 may be provided on the current sense line 251, and a first terminal of the second capacitor 252 may be connected to the current sense line 251 with a second terminal of the second capacitor 252 connected to a ground 253. The gain for the first resistor 242 and the second resistor 246 of the current sense unit 112 may be programmed for current sense accuracy purposes, but the values of the first resistor 242 and the second resistor 246 may be set such that the current sense signal is sufficiently high enough to fully turn-on the switch 213.

The IR drop detection unit 216 may be configured to receive the current sense signal, and determine the feedback signal based on the current sense signal. In some examples, the feedback signal may represent a level of voltage drop (or IR drop) caused by the cable 122. In some examples, the feedback signal may be a voltage that is a portion (or fraction) of the output voltage. However, this portion of output voltage may represent the level of voltage drop caused by the cable 122. In some examples, the level of voltage drop provided by the feedback signal may be correlated to with the amount of output current provided by the current sense signal. For example, the voltage drop caused by the cable's resistance may be a function of the current sense signal. For instance, as the output current increases (e.g., increases beyond a threshold level), the voltage drop of the output voltage may increase relatively proportionately. According to an aspect, the level of voltage drop determined by the IR drop detection unit 216 is correlated with amount of output current (beyond a threshold amount) sensed on the secondary windings 208. In some examples, the level of voltage drop linearly increases as the output current increases beyond a threshold amount.

Referring back to FIG. 1, the control unit 120 may receive the feedback signal, and adjust the output voltage in order to compensate for the voltage drop. In some examples, the control unit 120 may receive a reference voltage signal, and compares the feedback signal to the reference voltage signal. The reference voltage signal may be a pre-set voltage level that provides a threshold in which voltages above (or below) indicate that the output voltage has decreased or increased. Depending on the comparison, the control unit 120 may increase (or decrease) the output voltage in order to compensate for the voltage drop caused by the cable's resistance. In a non-limiting example, if the feedback signal is 0.5V, and the reference voltage signal is 0.8V, the control unit 120 may determine to increase the output voltage by a first amount (which may or may not be 0.3V). If the feedback signal is 0.3V and the reference voltage signal is 0.8V, the control unit 120 may determine to increase the output voltage by a second amount (greater than the first amount). Also, if the feedback signal is greater than the reference voltage signal, the control unit 120 may determine to decrease the output voltage. The above-values for the feedback signal and the reference voltage signal are used for explanatory purposes only, where the feedback signal and the reference voltage signal may encompass any type of values. Also, the correlation between 1) the difference of the feedback signal and the reference voltage signal, and 2) the amount that the output voltage is increased or decreased may vary depending on its implementation. In some examples, the voltage of the feedback signal is relatively close to the voltage of the reference voltage signal. In some cases, the difference may be in the tens of mV. The control unit 120 may amplify the differences between the feedback signal and the reference voltage signal, and then adjust the output voltage to minimize the difference.

Referring to FIG. 2, the IR drop detection unit 216 may include a voltage divider (e.g., first feedback resistor 215-1 and second feedback resistor 215-2), a switch 213, a compensation resistor 260, a fourth resistor 266, and/or a fifth resistor 264. The voltage divider may produce a voltage (e.g., the feedback signal) on the feedback line 261, which may be a fraction of the output voltage on the output voltage line 231. For example, the voltage divider referenced to ground 263 is created by the first feedback resistor 215-1 and the second feedback resistor 215-2.

The IR drop detection unit 216 may use the output current of the current sense signal to control the switch 213, thereby adjusting the effective resistance of the voltage divider connected to the output voltage, which produces a level of voltage drop corresponding to the level of output current represented by the current sense signal. In some examples, the switch 213 may be implemented as a bipolar junction transistor (e.g., having a base, emitter, and collector), as shown in FIG. 2. Depending on the amount of output current, the switch 213 may be on or off. In some examples, the switch 213 has a fully-on state and a fully-off state, and intermediate states between the fully-on state and the fully-off state. For example, if the output current is below a first threshold value, the switch 213 may be in the fully-off state (which indicates no voltage drop compensation). If the output current is above a second threshold value, the switch 213 may be in the fully-on state (which indicates maximum voltage drop compensation). In some examples, the second threshold value may be greater than the first threshold value. If the output current is between the first threshold value and the second threshold value, the switch 213 may be within one of a number of intermediate states (which indicates a level of partial voltage drop compensation).

In some examples, the IR drop detection unit 216 may be considered to increase or decrease the effective resistance of one part of the voltage divider—which affects the feedback signal (e.g., the voltage outputted on the feedback line 261). For example, the upper-part of the voltage divider may be the first feedback resistor 215-1, and the lower-part of the voltage divider may be the second feedback resistor 215-2, the second feedback resistor 215-2 in parallel with the compensation resistor 260, or the second feedback resistor 215-2 in parallel with the compensation resistor 260 plus the resistance associated with the switch 213. For instance, the effective resistance of the lower-part of the voltage divider may be dependent on the state of the switch 213, which the state of the switch 213 is controlled by the current sense signal.

For example, when the switch 213 is in the fully-off state, the IR drop detection unit 216 determines the feedback signal using only the first feedback resistor 215-1 and the second feedback resistor 215-2. For example, in the fully-off state, current would not flow between the collector and the emitter of the switch 213, thereby creating an open circuit (no connection from the compensation resistor 260 to ground 267). The IR drop detection unit 216 determines the feedback signal as the output voltage divided by the voltage divider having the values of Rfb1 and Rfb2. For example, when the switch 213 is off, the lower-part of the voltage divider is Rfb2 or Rfb2 in parallel with R_comp+infinity (e.g., Rfb2∥(R_comp+infinity)).

However, when the switch 213 is in the fully-on state, a connection between the compensation resistor 260 and the ground 267 is created (or a closed circuit is created). In this configuration, the compensation resistor 260 is in parallel with the second feedback resistor 215-2, which decreases the effective resistance of the lower part of the voltage divider (e.g., Rfb2∥R_comp). As a result, the voltage on the feedback line 261 is decreased or pulled down. The feedback signal may be pulled low for a relatively short period when the additional resistance (e.g., R_comp) is in parallel with the second feedback resistor 215-2. The short period may be dependent on the adapter's response time, which may be less than a millisecond.

In some examples, if the switch 213 is in the fully-on state, the adaptor 200 may provide maximum compensation for the cable's IR drop. In a non-limiting example, if the cable IR drop is 0.3V, the output voltage may be increased by 0.3V such that the voltage at the end of the cable 122 is the same as the output voltage at no load (no current). If the switch is in one of the intermediate states (e.g., partially-on), the second feedback resistor 215-2 may be in parallel with the compensation resistor 260+the saturation resistance of the switch 213. As such, the effective resistance of the lower-part of the voltage divider may be reduced to Rfb2∥(R_comp+Rce of the switch 213). Also, it is noted that for the fully-on state, the saturation resistance of the switch 213 is infinity, but for the fully-on state, the saturation resistance is zero.

In some examples, the values for the fourth resistor 266 and the fifth resistor 264 of the IR drop detection unit 216 may indicate when the cable IR drop detection begins to work. For example, depending on the implementation, the fourth resistor 266 and the fifth resistor 264 may be designed such that their values affect the timing of IR drop detection. For example, the switch 213 has a gate threshold voltage, and when the current sense signal is less than the gate threshold voltage, the switch 213 may be completely off. In a non-limiting example, the switch's threshold voltage is 0.7V, the gate current will start to increase and turn on the switch 213 when the current sense signal is over 0.7V. Depending on the implementation of the current sense unit 212, for instance, the current sense signal 0~3V may represent output current 0~3 A. If the ratio of the fourth resistor 266 and the fifth resistor 264 is 1 (e.g., R266/264=1), the IR compensation starts to work when output current=1.4 A, e.g., 0.7V for the gate voltage of the switch 213 after the 1:1 ratio of R266/R264.

Figure 3:
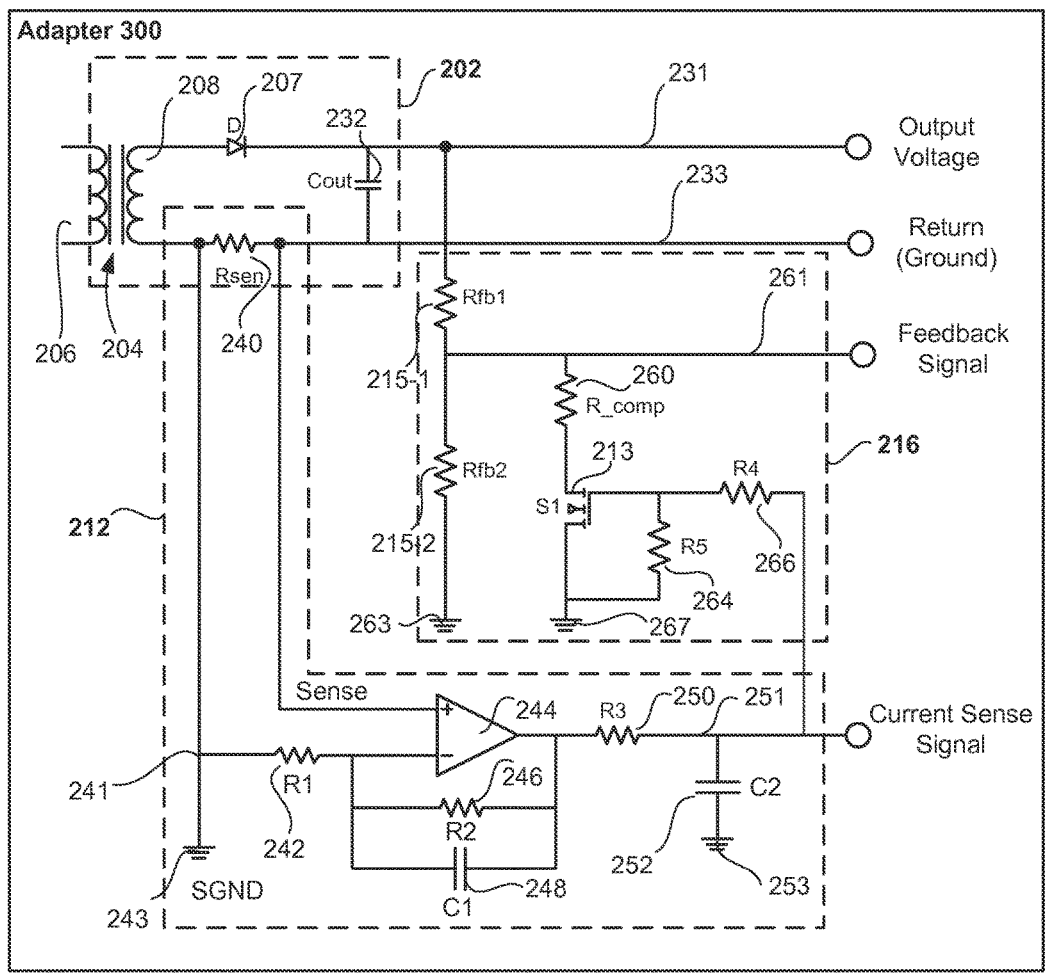
FIG. 3 illustrates an adaptor for IR drop compensation according to another aspect.

FIG. 3 illustrates an adaptor 300 for IR drop compensation according to an aspect. The adaptor 300 may include the same components as previously described with reference to FIG. 2 except that the switch 213 is implemented as a MOSFET transistor.

Figure 4:
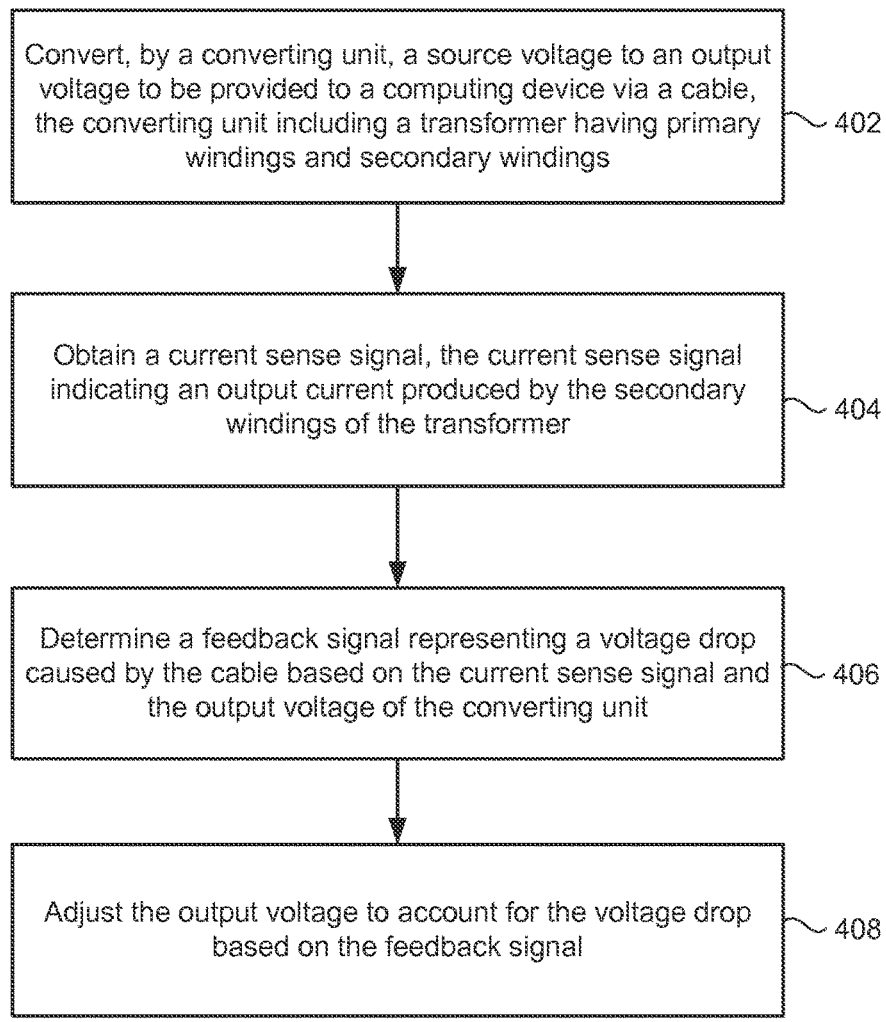
FIG. 4 illustrates a flowchart depicting example operations of the adaptor of FIGS. 1-3 according to an aspect.

FIG. 4 illustrates a flowchart 400 depicting example operations of the adaptor 100/200/300 of FIGS. 1-3 according to an aspect.

A source voltage may be converted to an output voltage by a converting unit to be provided to a computing device via a cable, where the converting unit includes a transformer having primary windings and secondary windings (402). For example, the converting unit 102/202 may be configured to convert the source voltage to the output voltage to be delivered to the computing device 123 via the cable 122. The converting unit 102/202 may include a transformer 104/204 having primary windings 106/206 and secondary windings 108/208, and a rectifier unit 107/207. The rectifier unit 107/207 may include any type and number of electrical devices used to convert to the output of the secondary windings 108/208 to the appropriate level of DC output voltage. In some examples, the rectifier unit 107/207 may include one or more diodes. In some examples, the rectifier unit 107/207 may include an arrangement of transistors.

A current sense signal may be obtained, where the current sense signal indicates an output current produced by the secondary windings of the transformer (404). For example, the current sense unit 112/212 may be configured to obtain a current sense signal indicating an output current produced on the secondary windings 108/208 of the transformer 104/204. The output current may include an amount (or level) of current produced by the secondary windings 108/208. The current sense unit 112/212 may be coupled to the secondary windings 108/208. In some examples, the current sense unit 112/212 may be coupled to a ground path (or return path) provided between the secondary windings 108/208 and the computing device 123. The current sense unit 112/212 may include an arrangement of electrical components (e.g., one or more resistors, one or more operational amplifiers, and/or one or more capacitors) that are capable of sensing the output current on the secondary windings 108. In some examples, the current sense unit 112/212 may include the sense resistor 240 provided on the ground path, and the operational amplifier 244 is coupled to the ground path at each side of the sense resistor 240 such that it detects the current through the sense resistor 240.

A feedback signal representing a voltage drop caused by a resistance of the cable may be determined based on the current sense signal and the output voltage of the converting unit (406). For example, the IR drop detection unit 116/216 may be configured to receive the current sense signal and the output voltage. The IR drop detection unit 116/216 may determine a feedback signal representing a level of voltage drop caused by the cable 122 based on the current sense signal and the output voltage. The feedback signal may represent a portion of the output voltage that corresponds to the amount of output current sensed by the current sense unit 112/212.

In some examples, the IR drop detection unit 116/216 may include the switch 113/213 that is configured to be controlled (e.g., ON, OFF, partially ON, partially OFF, etc.) by the current sense signal. For example, depending on the amount of output current provided by the current sense signal, the switch 113/213 may be in one of a number of states. The IR drop detection unit 116/216 may be configured to receive the output voltage produced by the converting unit 102/202, and determine the feedback signal based on the state of the switch 113/213—which adjusts the amount of voltage corresponding to the voltage drop. In some examples, the switch 113/213 is configured to adjust the voltage divider unit 115 that receives the output voltage and divides the output voltage to obtain the feedback signal, e.g., the portion of output voltage representing the level of voltage drop caused by the cable 122. Referring to FIG. 2, the IR drop detection unit 216 may include the voltage divider (e.g., first feedback resistor 215-1 and second feedback resistor 215-2), the switch 213, the compensation resistor 260, the fourth resistor 266, and/or the fifth resistor 264. The voltage divider may produce a voltage (e.g., the feedback signal) on the feedback line 261, which a fraction of the output voltage on the output voltage line 231.

The output voltage may be adjusted based on the feedback signal to account for the voltage drop (408). For example, the control unit 120 may be configured to adjust the output voltage produced by the converting unit 102/202 to account for the voltage drop based on the feedback signal. In some examples, the control unit 120 is configured to adjust the output voltage to account for the voltage drop. In some examples, the control unit 120 adjusts the duty cycle of the main switch on the primary-side. In some examples, the control unit 120 receives a reference voltage signal, and compares the feedback signal to the reference voltage signal. Depending on the comparison, the control unit 120 may increase (or decrease) the output voltage in order to compensate for the voltage drop caused by the cable's resistance.

The terms "a" or "an," as used herein, are defined as one or more than one. The term "another," as used herein, is defined as at least a second or more. The terms "including" and/or "having", as used herein, are defined as comprising (i.e., open transition). The term "coupled" as used herein, is defined as connected, although not necessarily directly and mechanically.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Unless specifically stated otherwise as apparent from the above discussion, it is appreciated that throughout the description, discussions utilizing terms such as "processing" or "modifying" or "receiving" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An adaptor, comprising:
   a converting unit configured to convert a source voltage to an output voltage to be provided to a computing device via a cable, the converting unit including a transformer having primary windings and secondary windings;
   a current sense unit coupled to the secondary windings of the transformer, the current sense unit configured to obtain a current sense signal indicating an output current produced by the secondary windings of the transformer;
   an IR drop detection unit configured to determine a feedback signal representing a voltage drop caused by the cable based on the current sense signal and the output voltage, the IR drop detection unit including a voltage divider connected to the output voltage, and a switch controlled by the current sense signal, wherein switching of the switch is configured adjust an effective impedance of the voltage divider, wherein an output of the voltage divider is determined as the feedback signal; and
   a control unit configured to adjust the output voltage to account for the voltage drop represented by the feedback signal.

2. The adaptor of claim 1, further comprising:
   a power negotiator configured to determine the output voltage based on a voltage requirement of the computing device.

3. The adaptor of claim 1, wherein the current sense unit includes a sense resistor connected to the secondary windings, and an operational amplifier, the operational amplifier being configured to sense the output current through the sense resistor.

4. The adaptor of claim 1, wherein the switch includes a first state and a second state, the switch configured to be within the first state when the output current is below a first threshold value, the switch configured to be within the second state when the output current is above a second threshold value.

5. The adaptor of claim 4, wherein the voltage divider includes a first impedance in series with a second impedance, the IR drop detection unit including a compensation impedance, wherein, when the switch is in the first state, the feedback signal is determined based on the first impedance and the second impedance, wherein, when the switch is in the second state, the feedback signal is determined based on the first impedance, the second impedance, and the compensation impedance.

6. The adaptor of claim 5, wherein, when the switch is in the second state, the compensation impedance is in parallel with the second impedance causing an effective impedance of the second impedance to be reduced.

7. The adaptor of claim 1, wherein the feedback signal is a portion of the output voltage representing the voltage drop caused by the cable.

8. The adaptor of claim 1, wherein the switch is a semiconductor field effector transistor or a bipolar junction transistor.

9. The adaptor of claim 1, wherein the control unit is configured to receive a voltage reference signal and determine whether to adjust the output voltage based on a comparison of the voltage reference signal with the feedback signal.

10. An adaptor for IR drop compensation, the adaptor comprising:
a converting unit configured to convert a source voltage to an output voltage to be provided to a computing device via a cable, the converting unit including a transformer having primary windings and secondary windings;
a current sense unit coupled to the secondary windings of the transformer, the current sense unit configured to obtain a current sense signal indicating an output current produced by the secondary windings of the transformer;
an IR drop detection unit configured to determine a feedback signal representing a voltage drop caused by the cable based on the current sense signal and the output voltage, the IR drop detection unit including a switch controlled by the current sense signal, a compensation impedance, and a voltage divider connected to the output voltage, the voltage divider having a first impedance and a second impedance, wherein an output of the voltage divider is determined as the feedback signal, wherein, when the switch is within a first state, the feedback signal is determined using the first impedance and the second impedance, wherein, when the switch is within a second state, the feedback signal is determined using the first impedance, the second impedance, and the compensation impedance; and
a control unit configured to adjust the output voltage to account for the voltage drop based on the feedback signal.

11. The adaptor of claim 10, further comprising:
a power negotiator configured to determine the output voltage based on a voltage requirement of the computing device.

12. The adaptor of claim 10, wherein the current sense unit includes a sense resistor connected to the secondary windings, and an operational amplifier, the operational amplifier configured to sense the output current through the sense resistor.

13. The adaptor of claim 10, wherein, when the switch is in the second state, the compensation impedance is in parallel with the second impedance thereby reducing an effective impedance of the second impedance.

14. The adaptor of claim 10, wherein the first state does not provide voltage drop compensation, and the second state provides maximum voltage drop compensation.

15. The adaptor of claim 10, wherein the switch is a semiconductor field-effect transistor.

16. The adaptor of claim 10, wherein the switch is a bipolar junction transistor.

17. A method for IR drop compensation, the method comprising:
converting, by a converting unit, a source voltage to an output voltage to be provided to a computing device via a cable, the converting unit including a transformer having primary windings and secondary windings;
obtaining, by a current sense unit coupled to the secondary windings of the transformer, a current sense signal indicating an output current produced by the secondary windings of the transformer;
switching a switch from a first state to a second state when an amount of the output current is above a threshold value;
determining a feedback signal representing a voltage drop caused by the cable based on an output of a voltage divider connected to the output voltage, the voltage divider having a first impedance and a second impedance, wherein an effective impedance of the second impedance is reduced when the switch is in the second state by placing a compensation impedance in parallel with the second impedance; and
adjusting the output voltage to account for the voltage drop based on the feedback signal.

18. The method of claim 17, further comprising:
determining the output voltage based on a voltage requirement of the computing device.

19. The method of claim 17, wherein the feedback signal is a portion of the output voltage representing the voltage drop caused by the cable, the portion of the output voltage being correlated with the output current.

20. The method of claim 17, wherein the adjusting the output voltage includes receiving a voltage reference signal and determining whether to adjust the output voltage based on a comparison of the voltage reference signal and the feedback signal.

* * * * *